Nov. 6, 1962  E. R. HEALD ET AL  3,062,048
AIRCRAFT SPIN RECOVERY INSTRUMENT
Filed Oct. 19, 1960  2 Sheets-Sheet 2
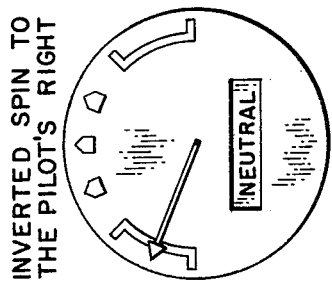
INVERTED SPIN TO THE PILOT'S RIGHT
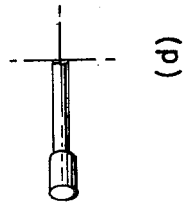
(d)
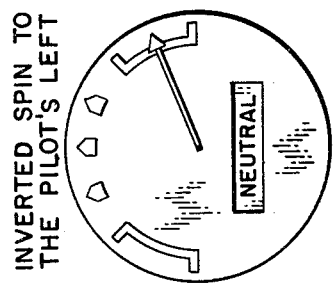
INVERTED SPIN TO THE PILOT'S LEFT
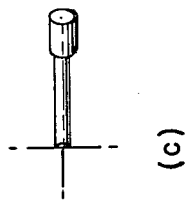
(c)
CONTROL STICK POSITIONS
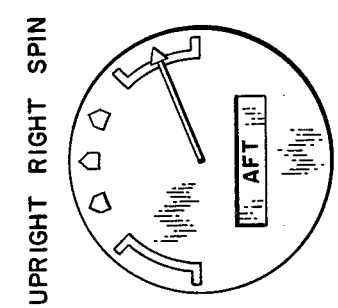
UPRIGHT RIGHT SPIN
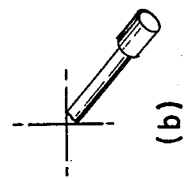
(b)
*Fig. 2*
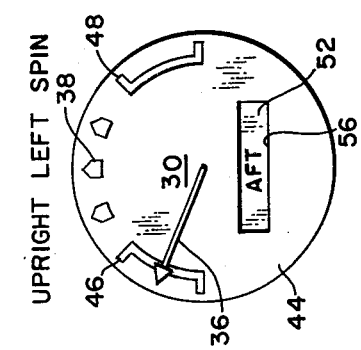
UPRIGHT LEFT SPIN
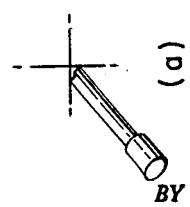
(a)
INVENTORS
ERVIN R. HEALD
MALCOLM J. ABZUG
BY
*George J. Rubens*
ATTORNEY _United States Patent Office_

3,062,048
Patented Nov. 6, 1962

3,062,048
AIRCRAFT SPIN RECOVERY INSTRUMENT
Ervin R. Heald and Malcolm J. Abzug, Pacific Palisades, Calif., assignors, by mesne assignments, to the United States of America as represented by the Secretary of the Navy
Filed Oct. 19, 1960, Ser. No. 63,706
4 Claims. (Cl. 73—178)

The present invention relates to an aircraft spin recovery instrument and more particularly to an instrument which will indicate to a pilot the proper control stick movement for recovery from either an upright or an inverted spin.

Due to the high yaw rates and combined pitching moments encountered during spins in modern swept-wing aircraft, conventional instruments, and/or visual flight references are inadequate in providing a pilot with the information necessary to recover from a spin. Present turn and bank indicators are inadequate for recovery information for the following reasons: (1) their inability to inform the pilot as to whether the aircraft is flying upright or inverted and (2) their limitation to a low maximum indicated yaw rate (usually in the order of 6° per second) when actual spin yaw rates often exceed 75° per second. The first inadequacy of present turn and bank indicators is material since the control stick movement required for recovery from an inverted spin is not the same as the control stick movement required for recovery from an upright spin. For recovery from an inverted spin, the pilot would use opposite aileron or other lateral controls to that required for an upright spin and further the pilot would not deflect the aircraft's elevators or other longitudinal controls for an inverted spin whereas he would deflect the elevators or other longitudinal controls for an upright spin. Because of the difficulty of a pilot to determine by his equilibrium whether he is in an upright or an inverted spin (especialy difficult when the yaw rate is high and/or the aircraft is near the transition from an upright spin to an inverted spin) it is necessary that he be informed at all times by some instrument of the proper control stick movement to recover the aircraft from either type of spin. The present invention provides this information by employing a gravity means such as a plumb bob for reversing the displacement and direction of travel of a rate-gyro-driven indicator needle when the aircraft changes from an upright position to an inverted position or vice versa and by further employing another indicator, also actuated by gravity, to show the elevator or other longitudinal controls required for recovery.

The second inadequacy of present turn and bank indicators as stated above, is also material because they do not afford the pilot any indication as to the degree of spin recovery attained. Proper recovery technique on modern aircraft calls for a neutralization of the controls as the rate of turn drops from a level such as 75° per second to zero. Should the pilot wait until the indicator shows less than 6° per second, as would be necessary in the case of a conventional turn and bank indicator, a new spin in an opposite direction would often occur since neutralization of the control would come too late. The present invention obviates this difficulty by providing a larger rate of turn range on an indicator so that the pilot will be apprised of the first signs of reduction of the turn rate of the aircraft.

An object of the present invention is to provide an aircraft instrument which will indicate to a pilot the proper control stick movement to recover from an upright or an inverted spin.

Another object is to provide an aircraft spin recovery instrument which will inform a pilot of the degree of recovery from an upright or an inverted spin.

Other objects and many of the attendant advantages of this invention will be readily appreciated as the same become better understood by reference to the following detailed description when considered in connection with the accompanying drawings where:

FIG. 2 shows the required control stick positions for various readings of the spin recovery instrument.

Figure 1:
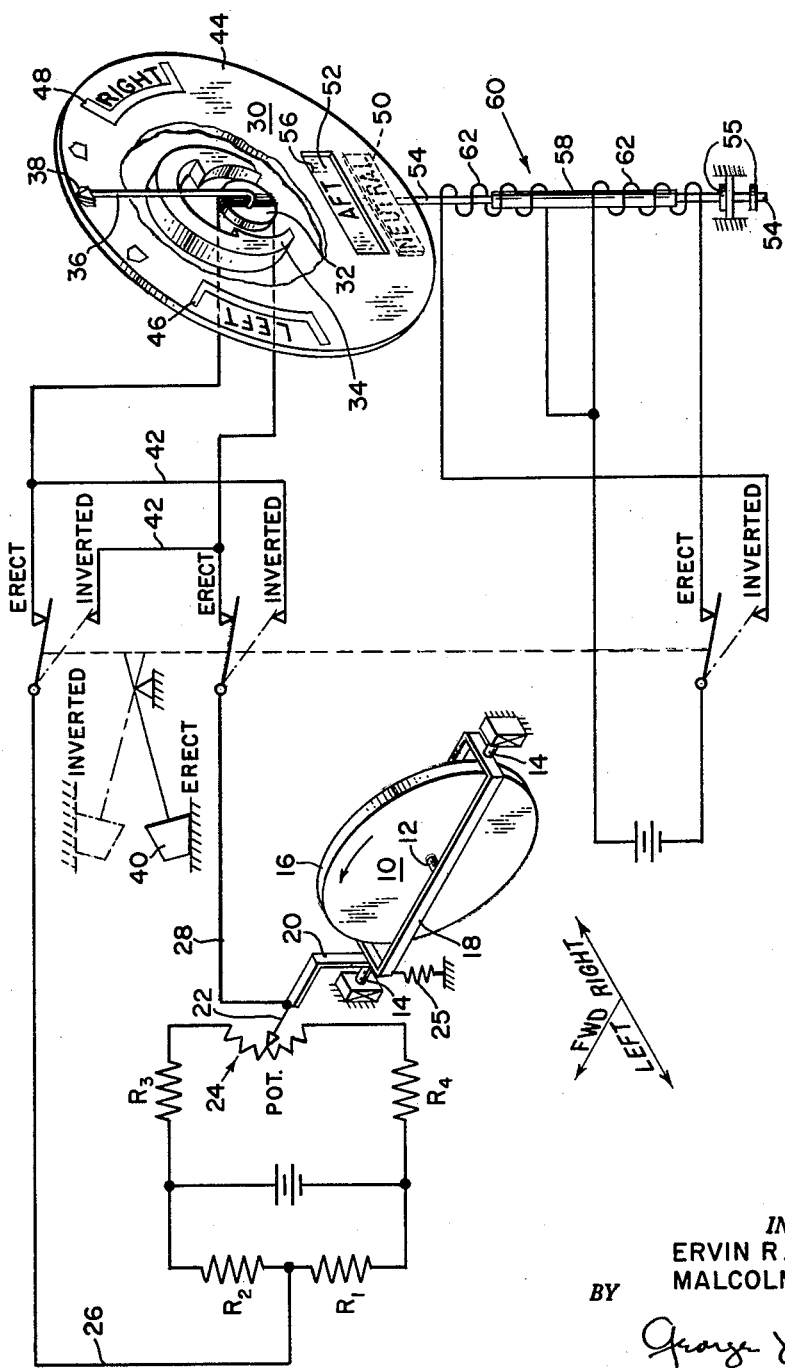
FIG. 1 is a diagrammatic view of the spin recovery instrument.

Referring now to the drawings wherein like reference numerals designate like or corresponding parts throughout the several views, there is shown in FIG. 1 a rate gyro 10 having a spin axis along a spin shaft 12 and a gimbal axis along gimbal shafts 14, the spin axis being substantially parallel to a lateral axis of an aircraft (not shown) and the gimbal axis being substantially parallel to a longitudinal axis of the aircraft so that as the aircraft turns from its longitudinal axis the rate gyro 10 will precess accordingly about the gimbal axis. Assuming that the nose of the aircraft is located forward of the rate gyro 10 in FIG. 1 and that the rate gyro is spinning counterclockwise as shown by the arrow in FIG. 1, the top 16 of the gyro will precess into the drawing about shafts 14 when the aircraft makes a left turn, and will precess out of the drawing about the shafts 14 when the aircraft makes a right turn. A gimbal 18, fixedy attached to the gimbal shafts 14, has a nonconductive wiper arm 20 intersecting the gimbal axis so that as the gyro precesses the arm 20 rotates about the gimbal axis.

Fixedly attached to rotate with the arm 20 is an electrical wiper 22 which wipes across an arc-shaped potentiometer 24, the wiper 22 being positioned at the center of the resistance of the potentiometer when the gyro 10 is not precessing by a spring 25 attached to the gimbal 18. The potentiometer 24 is part of a bridge circut having resistances $R_1$, $R_2$, $R_3$ and $R_4$ of values such as 10,000, 10,000, 4,700 and 4,700 ohms respectively and a voltage source such as 28 volts, the bridge circuit being in a balanced state when the gyro 10 is not precessing. When the aircraft makes a turn in either direction the gyro will precess accordingly causing the wiper 22 to wipe across the potentiometer 24 and unbalance the bridge circuit thereby introducing a current flow through bridge output leads 26 and 28, the direction of flow depending upon the direction of turn of the aircraft. The bridge output leads 26 and 28 are connected to an indicator 30, the indicator having all of the elements found in a D'Arsonval type meter. The leads 26 and 28 are connected together and are coiled about a core 32 within a permanent magnet 34 so that a needle 36 which is fixedly attached to the core 32 will be deflected to one side or the other from a zero mark 38, the direction of the deflection depending upon the direction of current flow through the leads 26 and 28. Each lead 26 and 28 between the bridge circuit and the indicator 30 has a gravity switch which is mechanically operated by a plumb bob 40, the plumb bob and the switches being in an erect position when the aircraft is upright and being in an inverted position when the aircraft is inverted. When the switches go from an erect position to an inverted position crossover leads 42 reverse the direction of flow of the current through the bridge output leads 26 and 28 about the core 32 thereby reversing any displacement of the needle 36 from the zero mark 38 and also reversing the direction of travel of the needle. While for diagrammatic purposes the gravity switches have been described as actuated by the plumb bob 40, the same result may be obtained by rotatably mounted switch flaps, which flaps by their own weight will rest on contacts representing an erect position when the aircraft is upright and upon the aircraft being inverted will rotate by their own weight about one end to rest against contacts representing an inverted position. To employ switches of this nature with the particular indicator 30 shown in FIG. 1 it would be necessary to reverse the crossover leads 42 or reverse the direction of spin of the gyro 10.

The indicator 30 has a face plate 44 with nomenclature imprinted thereon including the zero mark 38, a left control stick mark 46 and a right control stick mark 48. Each of the control stick marks 46 and 48 covers a range from 8° per second to 75° per second rate of turn of the aircraft. In order to recover from an upright or an inverted spin of the aircraft a pilot will move his ailerons or other lateral controls according to the position of the needle 36, the pilot moving his control stick to the left when the needle 36 is to the left of the zero mark 38 and to the right when the needle 36 is to the right of the zero mark 38.

Having described the portion of the instrument for indicating the proper lateral stick movement to recover from a spin, the remainder of the instrument which informs the pilot as to the proper fore-and-aft stick movement to recover from a spin will now be described. This part of the instrument includes a "neutral" card 50 and an "aft" card 52 fixedly mounted one above the other on a nonconductive shaft 54, the cards being visible one at a time through an opening 56 in the face plate 44 as the shaft 54 moves up and down within the distance between stops 55. The shaft 54 is fixedly attached to a core 58 of a longitudinal solenoid 60. The core 58 is off-centered within each of two coils 62 so that upon either of the coils 62 being energized the core 58 will move in a direction which will tend to center it within the energized coil, this movement causing either the "neutral" card 50 or the "aft" card 52 to appear behind the opening 56. Between a voltage source and the longitudinal solenoid 60 is a gravity switch operated by the movement of the plumb bob 40, the bottom coil 62 being energized when this switch is in an erect position (aircraft upright) and the top coil 62 being energized when the switch is in an inverted position (aircraft inverted). While the cards 50 and 52 are described as being actuated by the longitudinal solenoid 60 and a gravity switch the same result can be obtained by the weight of the cards 50 and 52 and the shaft 54, this weight positioning the "aft" card 52 behind the opening 56 when the aircraft is upright and the weight positioning the "neutral" card 50 behind the opening when the aircraft is inverted, the movement of the shaft 54 again being limited by the stops 55.

In the operation of the device let four examples representing the four possible types of spins be assumed, namely (1) upright left spin, (2) upright right spin, (3) inverted left spin, and (4) inverted right spin. The direction of the spin, left or right, refers to the pilot's left or right respectively as shown in FIG. 2, whether the aircraft is upright or inverted.

*Example 1*

Assume an upright spin to the pilot's left. Since the aircraft is upright the plumb bob 40 will be holding the switches in an erect position. The top 16 of the gyro will precess into the drawing unbalancing the potentiometer 24 which causes a current to flow out of lead 26 to the indicator 30, this current about the core 32 causing the needle 36 to be deflected toward the left control stick mark 46 according to the rate of spin. At the same time the gravity switch for the longitudinal solenoid will be in an erect position causing the voltage source to energize the bottom coil 62. The core 58 will then move down because of its tendency to center itself within the bottom coil, thereby positioning the "aft" card 52 behind the opening 56. The indicator will appear as shown in FIG. 2(a) and the pilot will execute control stick movement as shown in the same figure for recovery from this spin.

*Example 2*

Assume an upright spin to the pilot's right. The operation of the device for this type of spin is the same as that described in Example 1 except the top 16 of the gyro will precess out of the drawing causing a current to flow in the leads 26 and 28 in a direction opposite to that in Example 1 thereby deflecting the needle 36 toward the right control stick mark 48. FIG. 2(b) shows how the indicator will appear with the control stick movement to be executed for recovery.

*Example 3*

Assume an inverted spin to the pilot's left. Since the aircraft is inverted all of the gravity switches will be in an inverted position. The top 16 of the gyro (which is still top as the pilot would see the gyro) will precess into the drawing causing a current flow out of lead 26 as described in Example 1 except this current will flow around the core 58 in an opposite direction to that described in Example 1 because the gravity switches are now in an inverted position. Accordingly, the needle 36 is deflected in the direction of the right control stick mark 48 rather than the left control stick mark as described in Example 1. The gravity switch for the longitudinal solenoid will be in an inverted position thereby energizing the top coil 62 so that the core 58 by its tendency to center itself within this coil will move up to position the "neutral" card behind the opening 56. FIG. 2(c) shows how the indicator will appear with the control stick movement required for recovery.

*Example 4*

Assume an inverted spin to the pilot's right. The operation of the device will be the same as that described in Example 3 except the gyro will precess in an opposite direction thereby causing the needle 36 to be deflected in an opposite direction, namely, toward the left control stick mark 46. FIG. 2(d) shows how the indicator will appear with the control stick movement required for recovery.

While the preferred embodiment is an electromechanical device as shown in FIG. 1, it is obvious that an all-mechanical device could be employed to perform the same function. For instance, one of the gimbal shafts 14 can be directly coupled to the needle 36 by suitable gearing or by friction journaling one into the other. Upon inversion of the aircraft, a gravity means such as a plumb bob can be used to drive (through suitable gearing) the rate gyro 10 and the spring 25 through a 180° arc. This will cause the rate gyro to spin in an opposite direction with respect to the pilot thereby giving opposite rotation to the pointer 36 by opposite precession of the gyro. Assuming a friction journaling between the gimbal shaft 14 and the needle 36 the position of the needle can be maintained while the gyro rotates by employing a rack gear driven by a gravity means which gear will engage, drive a pinion gear fixedly attached to the needle 180° and then disengage, the gravity means driving the rack gear only when the aircraft changes from an upright position to an inverted position or vice versa. Rather than rotate the gyro and maintain the position of the needle another mechanical arrangement would be to rotate the pointer 36 180° by a rack and pinion gear arrangement as described above. Upon inversion of the aircraft this arrangement would place the needle at the bottom of the face plate 44 where another zero mark 180° from the zero mark 38 would be printed. Note that in the latter arrangement the gyro will keep the same direction of spin with respect to the pilot and that the pointer will rotate in one direction for a right turn and in an opposite direction for a left turn whether the aircraft is upright or inverted. However, with respect to a mark at the bottom of the face plate the pointer will be displaced therefrom in an opposite direction to the displacement from the zero mark 38 for the same turn. Accordingly, where left stick control would be indicated for an upright left spin, right stick control would be indicated for an inverted left spin.

It is now apparent that the invention provides a simple instrument which will inform a pilot the required control stick movement for recovery from an upright or an inverted spin and also inform him as to the rate of the spin so that he will not overcontrol the stick.

Obviously many modifications and variations of the present invention are possible in the light of the above teachings. It is therefore to be understood that within the scope of the appended claims the invention may be practiced otherwise than as specifically described.

We claim:

1. A spin recovery instrument for informing a pilot of an aircraft the proper control stick movement for recovery from an upright or an inverted spin comprising a rate gyro having a spin axis substantially parallel to a lateral axis of the aircraft and a gimbal axis substantially parallel to a longitudinal axis of the aircraft, the gyro producing an output by precession about the gimbal axis when the aircraft makes a turn, the output of the gyro having magnitude and direction according to the rate of turn and direction of turn of the aircraft respectively, an indicator means coupled to the output for responding in magnitude and direction to the magnitude and direction of the output, the direction of the response of the indicator being to the left or the right of a zero reference mark as viewed forwardly by the pilot for informing the pilot to move the control stick to his left or his right respectively, means responsive to gravity for reversing the indication of the indicator when the aircraft is inverted whereby upon flying the aircraft in an upright spin a right or left turning rate of the aircraft will be indicated by the indicator means as a right or left control stick movement respectively as viewed by the pilot and upon flying the aircraft in an inverted spin a right or left turning rate of the aircraft will be indicated by the indicator as a left or right control stick movement respectively as viewed by the pilot, and a second indicator means responsive to gravity for indicating aft movement of the control stick for an upright spin and neutral fore and aft movement of the control stick for an inverted spin whereby the pilot can recover the aircraft from an upright or an inverted spin by moving the control stick according to the indications on said first and second indicator means.

2. A spin recovery instrument as claimed in claim 1 wherein the indicator means has a needle responsive to the output of the gyro and a face plate underlying the needle, the face plate having markings underlying the needle for showing movement of said needle, the markings including in addition to the zero reference mark a left and a right control stick mark to the left and the right respectively of the zero mark for indicating proper left or right control stick movement for spin recovery, each of the left and right control stick marks being of such a length so as to cover a rate of turn of the aircraft of a least 75° whereby a pilot upon recovering from a spin will be apprised of the degree of recovery so that he will not overcontrol the stick.

3. A spin recovery instrument for informing a pilot of an aircraft the proper control stick movement for recovery from an upright or an inverted spin comprising a rate gyro having a spin axis substantially parallel to a lateral axis of the aircraft and a gimbal axis substantially parallel to a longitudinal axis of the aircraft, the gyro producing an output by precession about the gimbal axis when the aircraft makes a turn, the output of the gyro having magnitude and direction according to the rate of turn and direction of turn of the aircraft respectively, an indicator means for informing the pilot the proper movement of the control stick to the left or the right as viewed forwardly by him, means for connecting the indicator means to the gyro output, said indicator means being responsive in magnitude and direction to the magnitude and direction of the gyro output whereby the response of the indicator means in direction informs the pilot whether to move the control stick to the left or the right, means responsive to gravity coupled to the connection means for reversing the direction of the gyro output when the aircraft is inverted whereby upon flying the aircraft in an upright spin a right or left turning rate of the aircraft will be indicated by the indicator means as viewed by the pilot as a right or left control stick movement respectively and upon flying the aircraft in an inverted spin a right or left turning rate of the aircraft will be indicated by the indicator as viewed by the pilot as a left or right control stick movement respectively, and a second indicator means responsive to gravity for indicating aft movement of the control stick for an upright spin and neutral fore and aft movement of the control stick for an inverted spin whereby the pilot can recover the aircraft from an upright or an inverted spin by moving the control stick according to the indications on said first and second indicator means.

4. A spin recovery instrument for informing a pilot of an aircraft the required left or right movement of a control stick to position the aircraft's ailerons or other lateral controls for recovery from an upright or an inverted spin comprising a rate gyro having a spin axis substantially parallel to a lateral axis of the aircraft and a gimbal axis substantially parallel to a longitudinal axis of the aircraft, the gyro producing an output by precession about the gimbal axis when the aircraft makes a turn, the output of the gyro having magnitude and direction according to the rate of turn and direction of turn of the aircraft respectively, an indicator means coupled to the output for responding in magnitude and direction to the magnitude and direction of the output, the direction of the response of the indicator being to the left or right of a zero reference mark as viewed forwardly by the pilot for informing the pilot to move the control stick to the left or the right respectively as viewed by him means responsive to gravity for reversing the indication of the indicator when the aircraft is inverted whereby upon flying the aircraft in an upright spin a right or left turning rate of the aircraft will be indicated by the indicator means as a right or left control stick movement respectively as viewed by the pilot and upon flying the aircraft in an inverted spin a right or left turning rate of the aircraft will be indicated by the indicator as a left or right control stick movement respectively as viewed by the pilot.

References Cited in the file of this patent

UNITED STATES PATENTS

| | | |
|---|---|---|
| 1,794,749 | Zelov | Mar. 3, 1931 |
| 1,835,777 | Hennegan | Dec. 8, 1931 |
| 2,156,012 | Doyle | Apr. 25, 1939 |

FOREIGN PATENTS

| | | |
|---|---|---|
| 553,730 | Great Britain | June 3, 1943 |
| 708,969 | Great Britain | May 12, 1954 |